Patented Apr. 23, 1935

1,998,470

UNITED STATES PATENT OFFICE 1,998,470

PURIFICATION PROCESS

Hugh S. Taylor, Princeton, N. J., assignor to E. I. du Pont de Nemours & Company, Wilmington, Del., a corporation of Delaware No Drawing. Application January 28, 1932, Serial No. 589,524

6 Claims. (Cl. 23—236)

This invention relates to the manufacture of catalytic materials and more particularly to the manufacture of sulfur-free nickel catalysts.

Hitherto in the manufacture of catalysts, particularly those which are very sensitive to poisons, such as catalytic nickel for example, it has been the general procedure to purify the raw materials by purification processes in order to prevent the poisoning of the catalytic material by small amounts of impurities. Furthermore, even when very pure raw materials were used, the extensive washing treatment which is usually required for precipitated catalysts made the use of ordinary sources of water unsuitable, making it necessary to resort to the use of distilled water with consequent increase in cost of production.

Chemical methods have been used for the removal of poisonous impurities from catalytic materials either during or after their preparation. For example hypochlorous acid or its salts have been used (German Patent No. 429,877) for the removal of sulfur compounds from metallic catalysts such as nickel, either during preparation or regeneration.

It is the object of this invention to provide a new and improved method of treating chemical compounds whereby said compounds may be obtained in their finished form free from undesirable impurities.

It is a further object of the invention to treat catalytic materials during their preparation to remove therefrom impurities which act as poisoning influences on the catalyst.

It is particularly an object of this invention to provide an improved method of treating a nickel catalyst during its preparation in order to render it substantially free from sulfur.

These objects are accomplished by a modification of the usual method of washing the precipitated oxide, hydroxide, carbonate or other suitable salt, consisting of dissolving in the water supply used for washing, a sufficient amount of a water-soluble compound preferably one of small solubility having an anion or a cation in common with that of the precipitate.

The following examples illustrate various preferred forms of applying the process which comprises the subject matter of the present invention.

Example I

A nickel carbonate catalyst supported on kieselguhr was precipitated from a suspension of kieselguhr in aqueous nickel nitrate solution by the slow addition at 70° C. of sodium carbonate solution in 10% excess. The solutions were made up with tap water containing 0.015 grams $SO_4$ per liter, and the supported catalyst so prepared was analyzed before washing and found to contain 0.31% $SO_4$. The prepared catalyst was then washed ten times at 70° C. with tap water from the same source to which had been added 0.15% of ammonium carbonate. The catalyst was found to contain only 0.06% $SO_4$.

The advantage gained by the use of ammonium carbonate in the wash water is apparent from the observation that when a second catalyst prepared in exactly the same way as the first catalyst was washed under the same conditions with the same amount of tap water from the same source but containing no added ammonium carbonate, the washed catalyst contained 0.35% $SO_4$.

The above example exhibits the common ion effect in preventing absorption of impurities, and in removing and desorbing impurities already deposited on the product.

Example II

Eighty-five grams of nickel carbonate deposited on kieselguhr was prepared in the same manner as described in Example I. Analysis of this product before washing showed that it contained 0.31% $SO_4$. This precipitate was washed with two liters of hot distilled water, free from sulfate, containing 28 grams of ammonium carbonate, after which it was dried and analyzed and found to contain only 0.07% $SO_4$. The wash water which ordinarily was sulfate-free contained after the washing process 0.18 grams of $SO_4$ which is equivalent to that lost from the catalyst.

Example II demonstrates the desorption of poisonous impurities already absorbed by the product, by the use of the common ion effect.

Example III

One hundred and ninety grams of zinc oxalate prepared by precipitation from a 2 molar aqueous zinc nitrate solution with an equal volume of 2 molar aqueous ammonium oxalate solution was washed five times with water containing 0.05–0.1% chlorides. The absorption of the chlorides on the zinc oxalate precipitate was prevented by adding 1.0–2.0% of ammonium oxalate to the wash water.

The following examples illustrate the efficacy of a common cation effect as distinguished from the common anion effect described in Examples I to III.

Example IV

One hundred and ninety grams of zinc oxalate prepared as in Example III was freed from adsorbed sodium salts by washing with water containing 1.0–2.0% of zinc nitrate.

Example V

Zinc oxalate prepared by the procedure outlined in Example III was washed with water containing 1.0–2.0% of zinc acetate. The washed product was found to have been freed substantially of sodium salts.

The zinc salt used in Example V has a solubility less than that of the zinc nitrate of Example IV, but greater than that of zinc oxalate. In lieu of the zinc acetate, any other zinc salt of an organic acid having a greater solubility than zinc oxalate, and a less solubility than zinc nitrate, may be used.

The compounds illustrated in the various examples as having an ion in common with an ion of the product undergoing purification, vary in solubility between wide limits. However, the use of compounds having a small solubility, which is, however, greater than that of the product to be washed, is preferred over that of compounds having a large solubility. Slightly soluble compounds are much more strongly adsorbed than highly soluble compounds, and the stronger the degree of adsorption of the salt in the wash water the more efficient is the use of the wash water to remove deleterious impurities.

The principle embodied in this invention need not be limited to the manufacture of catalytic materials but may be applied to the purification of any precipitated oxide, hydroxide, or salt.

It is evident that the concentration of the ammonium salt or other soluble compound of the character described in the wash water will depend in each particular case on the concentration of the undesired or deleterious impurities present either in the wash water or in the precipitate. In any particular case the common ion concentration of the added compound should be in excess of the concentration of the corresponding ion of the impurity, and consequently a considerable range of concentration may be used without departing from the spirit and scope of this invention. The preferred concentration however, is that which will give a ratio of anions of the ammonium salt to the anions of the impurity of from 50:1 to 200:1, a like concentration being preferred when using a solution of any other compound having a common ion effect. The upper limit of the concentration is naturally that of the solubility of the salt.

It is apparent from the examples and the theory of the invention, that this invention applies not only to the prevention of the adsorption of deleterious ions on the precipitate, but to the removal by desorption of the deleterious ions from the precipitate.

The use of ammonium compounds having an anion in common with the anion of a catalyst for the removal of impurities as illustrated in Examples I to III is particularly efficacious since adsorbed ammonium salts of the character described exert no poisoning influence on catalysts, and need not be removed after removal of the poisoning impurities. The same consideration governs the use of certain salts of organic acids when use is made of the common ion effect, e. g., zinc acetate as used in Example V.

Since the principle embodied in this invention is independent of the method of precipitation or other treatment prior to washing, and of the temperature, rate, and manner of washing, it is obvious that its use may be applied and combined with the greatest variety of processes and equipment.

In accordance with the theory of the invention, insoluble precipitates show a much higher adsorptive capacity for salts with ions common to both salt and precipitate, than for salts which do not possess an ion in common.

Thus, nickel carbonate in the presence of a solution containing ammonium carbonate and sodium sulfate, shows a tendency to absorb the carbonate preferentially. Or if the nickel carbonate contains adsorbed sulfate ions the tendency is, because of the difference in adsorptive capacity, for the sulfate to be desorbed and replaced by the carbonate ion.

This invention has proved to be particularly successful in the preparation of nickel catalysts. It has a valuable application to the preparation of nickel catalysts which are substantially free from the poisoning influence of sulfates and other sulfur compounds. It may be applied to the preparation of any catalytic material which is made by precipitation, or to the preparation of precipitated materials for any other purpose.

Advantages to be obtained by the use of this invention are:

(1) The raw materials from which the desired product is manufactured need not be purified beyond the degree usually obtainable from standard commercial sources, thus lowering the cost of the starting materials.

(2) Cheaper reagents such as sodium hydroxide or sodium carbonate may be used instead of ammonia, as precipitant.

(3) Ordinary sources of water may be used instead of distilled water.

(4) The use of markedly adsorbed salts in the wash waters exercises a further beneficial effect in the preparation of catalysts since it militates against the peptization of precipitates which is a common feature of precipitate purification with distilled water, which peptization materially increases the difficulty of and the time consumed in bringing the precipitate into suitable conditions for use as a catalyst.

The above description and specific examples are to be taken as illustrative only. Any variation therefrom which conforms to the spirit of the invention is intended to be included within its scope.

I claim:

1. In the method of obtaining a nickel catalyst substantially free from sulfur, the process which comprises thoroughly washing an impure, insoluble nickel compound from which the catalyst is to be derived, with a solution of an ammonium salt having an anion in common with the nickel compound, the anion concentration of the ammonium salt being from 50 to 200 times as great as the anion concentration of the sulfur impurities present at any time during the washing, and continuing the washing until the catalyst has reached the desired degree of purity, then drying the purified catalyst.

2. In the method of obtaining a nickel catalyst substantially free from sulfur, the process which comprises thoroughly washing an impure, insoluble nickel compound from which the catalyst is to be derived, with a solution of an ammonium salt having an anion in common with the nickel compound, the anion concentration of the ammonium salt being at least 50 times as great as the anion concentration of the sulfur impurities present at any time during the washing, and continuing the washing until the catalyst has reached the desired degree of purity, then drying the purified catalyst.

3. In the method of obtaining a nickel catalyst substantially free from undesirable impurities, the process which comprises washing impure nickel carbonate from which the catalyst is to be derived with a solution of ammonium carbonate.

4. In the method of obtaining a nickel catalyst substantially free from undesirable impurities, the process which comprises washing impure nickel carbonate from which the catalyst is to be derived with a solution of ammonium carbonate, the ion concentration ratio of the ammonium carbonate with respect to that of the impurities which it is desired to remove being at least 50 to 1.

5. In the method of obtaining a nickel catalyst substantially free from undesirable impurities, the process which comprises washing impure nickel carbonate from which the catalyst is to be derived with a solution of ammonium carbonate, the ion concentration ratio of the ammonium carbonate with respect to that of the impurities which it is desired to remove being at least 50 to 1, and continuing the washing until the catalyst has reached the desired degree of purity, then drying the purified catalyst.

6. The catalyst composition prepared according to the method described in claim 3.

HUGH S. TAYLOR.